United States Patent Office 3,440,236
Patented Apr. 22, 1969

3,440,236
SEPARATION OF CHLORINATED POLYVINYL CHLORIDE FROM ITS SOLUTION IN TETRA-CHLOROETHANE
Reginald Thomas Foster and John Heyward Taylor, Widnes, England, assignors to Imperial Chemical Industries Limited, London, England, a corporation of Great Britain
No Drawing. Filed Aug. 26, 1963, Ser. No. 304,653
Claims priority, application Great Britain, Sept. 17, 1962, 35,283/62
Int. Cl. C08f 27/02
U.S. Cl. 260—92.8          7 Claims The present invention relates to the production of polyvinyl chloride. More particularly it relates to the separation of chlorinated polyvinyl chloride from its solution in tetrachloroethane.

It is known to obtain a homogeneously after-chlorinated polyvinyl chloride by reaction of chlorine with polyvinyl chloride dissolved in an organic solvent, usually tetrachloroethane. The after-chlorinated product is then obtained as a solution in the tetrachloroethane, and one of the troubles of operating this chlorination process is the difficulty of separating the chlorinated polymer from the solvent because of the tendency of the polymer and the solvent to form a gelatinous mixture.

It has been proposed for example in U.S.A. specification No. 2,080,589 to separate chlorinated polyvinyl chloride in the form of a powder from its solution in tetrachloroethane by cooling the solution to between 0° C. and —40° C. until the solution gelatinises and then adding a non-solvent such as methanol while stirring. This method of separation is however troublesome. Refrigeration is required and the cooled solution is very viscous so that it is difficult to obtain adequate mixing-in of the methanol, and unless the methanol is added very carefully a gelatinous mass of polymer is obtained instead of a powder. It has also been proposed for example in British specification No. 401,200 to remove the tetrachloroethane from solutions of chlorinated polyvinyl chloride in this solvent by steam distillation. This method, however, tends to precipitate the polymer as lumpy masses instead of a fine powder.

We have now found that chlorinated polyvinyl chloride can be separated as a fine powder from its solution in tetrachloroethane, without the need for cooling the solution below room temperature, by mixing the solution with a non-solvent such as methanol in a particular controlled manner.

According to the present invention a process for the separation of chlorinated polyvinyl chloride from its solution in tetrachloroethane comprises feeding the said solution into an agitated mixture of one part of tetrachloroethane and 0.25–0.6 part of methanol by volume and at the same time adding methanol alone or in admixture with tetrachloroethane to the said mixture so as to maintain the volume ratio of tetrachloroethane to methanol in the mixture within the same limits.

If the proportion of methanol in the said mixture is allowed to fall below about 0.25 part per one part of tetrachloroethane by volume there is a likelihood that precipitation of the polymer will not occur. On the other hand, if the said proportion of methanol exceeds about 0.6 part the precipitation may be so rapid that sufficient tetrachloroethane is retained within the polymer particles to produce a gel-like product and large aggregates.

In order to allow a margin of safety against these sources of trouble we restrict the proportion of methanol in the said mixture to the range 0.25–0.6 part per one part of tetrachloroethane by volume, and, furthermore, in order to ensure that the polymer is obtained in a finely divided powder form the said proportion of methanol is preferably maintained in the range of 0.25–0.5 part and most preferably in the range 0.3–0.35 part by volume.

It is known that when polyvinyl chloride is chlorinated in solution in tetrachloroethane a small proportion of the solvent is also unavoidably chlorinated to pentachloroethane. It must be understood that the process of the present invention embraces particularly the treatment of solutions of chlorinated polyvinyl chloride obtained in this manner and which consequently contain a small proportion of pentachloroethane as well as tetrachloroethane as solvent. The process is however equally applicable to solutions of the polymer in tetrachloroethane alone.

The process of the invention may be carried out at or above room temperature. Naturally, in order to avoid difficulties with the evaporation of solvent from the system it is preferred to work at a temperature below the boiling point of methanol. There is an advantage in working above room temperature when the chlorinated polyvinyl chloride produced has a chlorine content below about 61% or above about 65% by weight since such material has a reduced solubility in tetrachloroethane compared to material of 61–65% chlorine content and a higher working temperature helps to avoid any tendency for gelation of the tetrachloroethane solution of the chlorinated polymer.

In carrying out the process of the invention the solution of chlorinated polyvinyl chloride should be rapidly dispersed in the tetrachloroethane/methanol mixture. This can be ensured by feeding the polymer solution into the agitated tetrachloroethane/methanol mixture through a narrow-bore pipe or, in large scale operation, by spraying the solution or injecting it through multiple jets into the agitated mixture.

It will be understood that the process according to the invention readily lends itself to operation in a continuous manner for the isolation of chlorinated polyvinyl chloride from its solution in tetrachloroethane. For example the separation process according to the invention for precipitation of the polymer may be carried out continuously in a suitable vessel and an overflow from the vessel may be arranged to transfer continuously a suspension of the precipitated polymer in the mixed solvents to a filtration device. When operating in this manner we have found it advisable for filtration to take place without delay to avoid any tendency for agglomeration of the polymer particles. In order to avoid any such limitation and to assist filtration, however, we prefer to introduce an additional and optional step within the scope of the invention, whereby the suspension of polymer in the mixture of tetrachloroethane and methanol obtained in the precipitation step is mixed with a further quantity of methanol to bring the volume ratio of tetrachloroethane:methanol in the mixture to approximately 1:1. The suspension of polymer in the mixed solvents thereby obtained can be filtered without any special care and without difficulty. When working according to this additional feature of the invention the entire process of isolating the solid polymer may advantageously be carried out in a continuous manner, for example by carrying out the precipitation step continuously in one vessel, continuously removing a suspension of polymer in solvent from the precipitation vessel to a mixing vessel, where the step of mixing-in additional methanol is carried out, and continuously removing a suspension of polymer in solvent from this mixing vessel to a filtration device.

When operating batchwise or continuously, methanol and tetrachloroethane may be recovered from the filtrate in known manner for re-use. However, when the additional step is introduced of adding a further quantity of methanol to the mixture of precipitated polymer and solvents to bring the volume ratio of tetrachloroethane:methanol to 1:1 before filtration as described above, the filtrate will contain a sufficiently high proportion of methanol for it to be employed instead of methanol alone to maintain the required ratio of tetrachloroethane:methanol in the precipitation stage. A portion of the filtrate may therefore be fed back to the precipitation stage for this purpose if desired. Operation in this manner will not of course lead to any overall saving in usage of methanol or in recovery of solvents from the filtrate, and it will increase the flow of liquor through the apparatus. It can, however, be advantageous in obtaining rapid mixing of the polymer solution with the required amount of methanol in the precipitation stage.

The invention is illustrated by the following examples. All parts are by volume unless otherwise stated.

EXAMPLE 1

A solution in symmetrical tetracholorethane of chlorinated polyvinyl chloride containing 64% by weight chlorine (K value 63) was prepared by chlorination of a solution of polyvinyl chloride. The chlorinated polyvinyl chloride solution contained 7% by weight of polymer and about 4% by volume of pentachloroethane.

Working at room temperature (about 18° C.) 500 parts of a mixture of tetrachloroethane and methanol in which the volume ratio of tetrachloroethane:methanol was 1:0.3 were placed in a vessel fitted with a stirrer and, while stirring, 100 parts of the chlorinated polyvinyl chloride solution and 30 parts of methanol were added through separate feed pipes over a period of 3 minutes. The chlorinated polymer separated from the solution in the form of a finely divided white powder. A further 340 parts of methanol were immediately stirred into the mixture to bring the volume ratio of tetrachloroethane:methanol to approximately 1:1 and the whole contents of the vessel were passed through a filter. The chlorinated polyvinyl chloride retained on the filter was washed with methanol to remove residual tetrachloroethane and was dried to free it from methanol.

The above procedure was repeated using various ratios of tetrachloroethane to methanol in the separation step. The results are shown in the following table, in which the first and last results are outside the scope of the invention.

| Tetrachloroethane:methanol ratio by volume | Characteristics of separated polymer |
| --- | --- |
| 1:0.2 | No separation of solid. |
| 1:0.25 | Finely divided precipitate, but some polymer remained in solution. |
| 1:0.3 | Finely divided precipitate. |
| 1:0.4 | Finely divided precipitate but inferior to the previous batch. |
| 1:0.5 | Rather coarse precipitate, satisfactory. |
| 1:0.6 | Coarse precipitate, satisfactory. |
| 1:0.7 | Very coarse precipitate with gelatinous occlusions of tetrachloroethane. |

EXAMPLE 2

Using a solution of chlorinated polyvinyl chloride as in Example 1, the solid polymer was separated in continuous manner as follows, working at room temperature (about 18° C.).

A mixture of one volume of tetrachloroethane and 0.3 volume of methanol were placed in a first vessel fitted with a stirrer and into this the solution of chlorinated polyvinyl chloride in tetrachloroethane was fed at the rate of 1 volume per hour through one inlet pipe while ⅓ volume per hour of methanol was introduced through a second inlet pipe. A suspension of precipitated polymer in the mixed solvents was removed continuously from this first vessel through an overflow pipe into a second vessel fitted with a stirrer, into which ⅔ volume per hour of methanol was also introduced in order to bring the volume ratio of tetrachloroethane:methanol to approximately 1:1 in this vessel. The suspension of polymer in the mixed solvents was removed continuously from the second vessel through an overflow pipe to a filter, where the polymer was removed from the solvents. The polymer collected on the filter was washed with methanol and dried. The product was a finely divided white powder.

What we claim is:

1. A process for the separation of chlorinated polyvinyl chloride from its solution in tetrachloroethane, which comprises feeding the said solution into an agitated mixture of one part of tetrachloroethane and 0.25–0.6 part of methanol by volume and at the same time adding methanol alone or in admixture with tetrachloroethane to the said mixture so as to maintain the volume ratio of tetrachloroethane to methanol in the mixture within the same limits.

2. A process according to claim 1, wherein the said mixture consists of one part of tetrachloroethane and 0.25–0.5 part of methanol by volume and the said volume ratio is maintained within the same limits.

3. A process according to claim 1, wherein the said mixture consists of one part of tetrachloroethane and 0.3–0.35 part of methanol by volume and the said volume ratio is maintained within the said limits.

4. A process according to claim 1, which is carried out in a continuous manner and is followed by a filtration step in which solid chlorinated polyvinyl chloride is continuously removed from the mixture of tetrachlorothane and methanol.

5. A process according to claim 4, wherein before the filtration step a further quantity of methanol is added to bring the volume ratio of tetrachloroethane:methanol in the mixture to approximately 1:1.

6. A process according to claim 5, wherein a portion of the mixture of tetrachloroethane and methanol removed in the filtration step is recycled to the separation step.

7. The process as claimed in claim 1, wherein the process is carried out at a temperature of at least about 18° C.

References Cited

UNITED STATES PATENTS 1,982,765   12/1964   Schonburg _____ 260—92.8

FOREIGN PATENTS 548,486   10/1942   Great Britain.

JAMES A. SEIDLECK, *Primary Examiner.*

JOHN A. DONAHUE, JR., *Assistant Examiner.*

U.S. Cl. X.R.

260—33.4, 33.8